United States Patent [19]

Hambleton

[11] Patent Number: 4,548,341

[45] Date of Patent: Oct. 22, 1985

[54] PLASTIC INJECTOR WITH HEAT CONTROL

[75] Inventor: Robert J. Hambleton, Keithville, La.

[73] Assignee: AT&T Technologies, Inc., Berkeley Heights, N.J.

[21] Appl. No.: 548,116

[22] Filed: Nov. 2, 1983

[51] Int. Cl.[4] ............................................. B67D 5/62
[52] U.S. Cl. .............................. 222/146.6; 222/146.2; 222/146.5; 165/65; 165/30; 219/422; 425/550; 425/143
[58] Field of Search ................ 222/146.1, 146.2, 146.5, 222/146.6; 165/65, 30; 219/230, 301, 421, 422, 423, 424; 126/343.5 A; 228/52, 53; 425/143, 550, 376 R, 378 R, 378 S

[56] References Cited

U.S. PATENT DOCUMENTS

| 2,721,729 | 10/1955 | Van Riper | 165/64 |
| 3,758,001 | 9/1973 | Callan | 222/146.5 |
| 4,183,448 | 1/1980 | Nash | 222/146.5 X |
| 4,197,070 | 4/1980 | Koschmann | 425/143 X |
| 4,419,309 | 12/1983 | Krutchen | 264/321 X |

OTHER PUBLICATIONS

Plastics Machinery and Equipment, Feb. 1982, pp. 23 and 24, Jul. 1982, pp. 12-14.

Primary Examiner—Joseph J. Rolla
Assistant Examiner—Nils E. Pedersen
Attorney, Agent, or Firm—R. F. Kip, Jr.

[57] ABSTRACT

In a plastic injection apparatus comprising a barrel, an axially reciprocable, rotatable, plastic working screw in the bore of the barrel, a nozzle for injecting melted plastic from out of the front of the bore into a mold, and a plurality of axially spaced heater bands ringing the barrel over its length, the heat control for such apparatus is improved by subdividing the barrel into rear and front parts, impeding outward flow of heat from the rear part by the use of thermal insulating material and a heat reflective surface, and promoting outward flow of heat from the front part by the use of cooling means and of a tubular barrel cover which encloses such front part and has inner and outer surfaces which are heat absorptive and heat reflective, respectively. In one embodiment, the mentioned thermal insulating material is incorporated in a tubular insulating shroud enclosing the heater bands in the rear part and of greater I.D. than the O.D. of such bands. In another embodiment, such thermal insulating material is incorporated in a plurality of heat insulating jackets individually sheathing the outer surfaces of the heater bands in the rear part.

7 Claims, 3 Drawing Figures

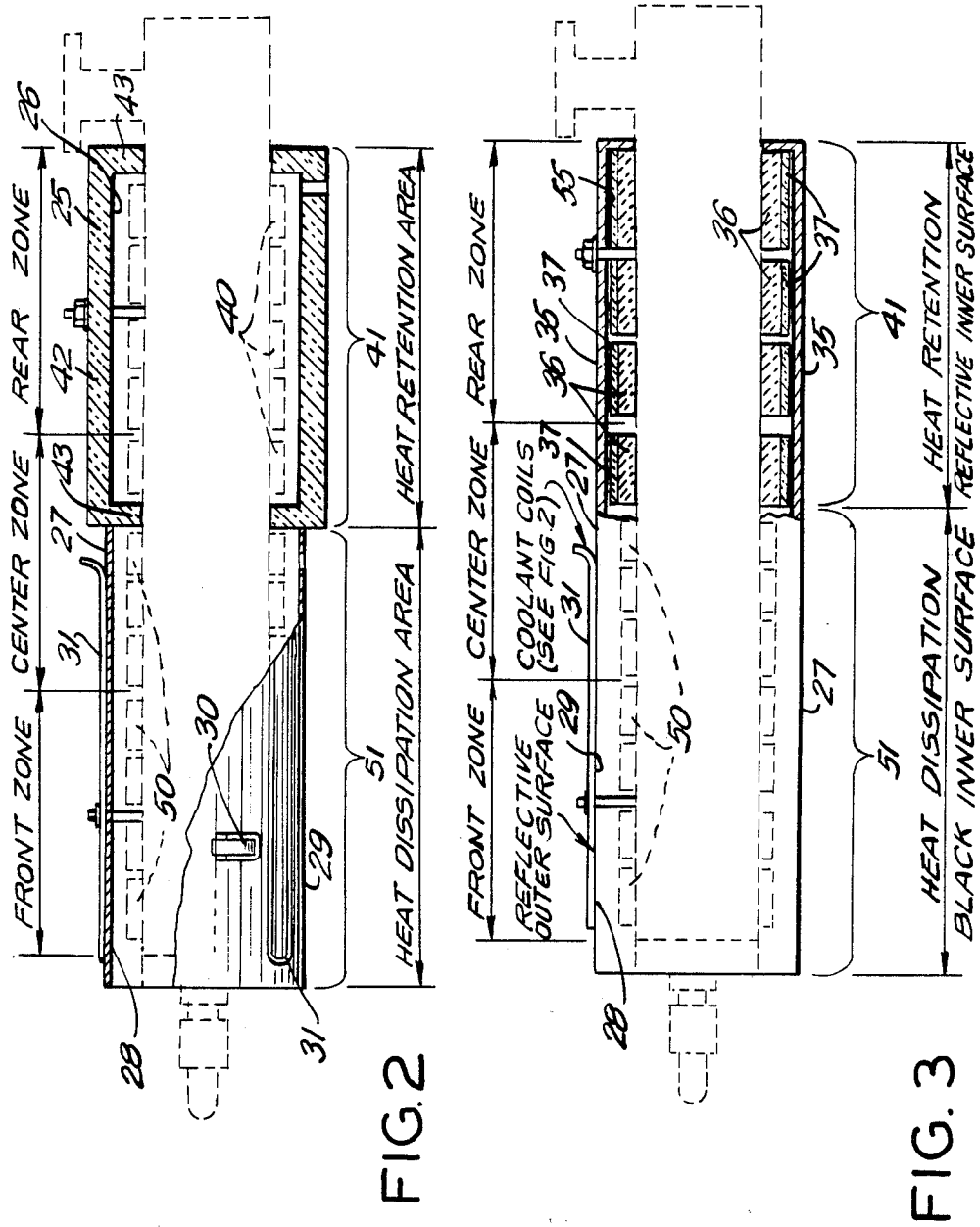

PLASTIC INJECTOR WITH HEAT CONTROL

FIELD OF THE INVENTION

This invention relates generally to apparatus for converting solid plastic resin into melted resin by heating, and for then injecting amounts of the melted resin into a mold or other recovery means. More particularly, this invention relates to apparatus of such kind provided with means for appropriately controlling the heating of the resin so that its viscosity and other qualities will continuously be kept close to the values therefor which are optimum for injection of the resin.

BACKGROUND OF THE INVENTION

Various schemes have heretofore been proposed for heat control of plastic resin being converted in apparatus from solid into melted form. Thus, for example, U.S. Pat. No. 2,721,729 issued Oct. 25, 1955 to J. W. Van Riper discloses a plastic extruder in which plastic material is advanced through a barrel by a screw so as to be extrudable from a delivery head at the front of the barrel. In the Van Riper extruder, the barrel has formed therein a plurality of deep circumferential grooves spaced axially over substantially the full length of the barrel and used both as seats for heating bands for heating the barrel and as recesses for receiving cooling fluid for cooling the barrel. Such heating and cooling arrangement for the Van Riper apparatus has, however, the disadvantages that the grooves employed therein are costly to fabricate, the arrangement is wasteful because it provides for liquid cooling of the rear part of the barrel where such cooling is not needed, and the arrangement lacks features which structurally differentiate the arrangement over the length of the barrel such that the arrangement is structurally adapted to retain more heat over the barrel's rear part than is retained over its first part, and to lose more heat over the barrel's front part than is lost over the rear part.

SUMMARY OF THE INVENTION

One or more of the aforementioned disadvantages are overcome according to the invention by an improvement in plastic injection apparatus comprising an axially extending barrel, an axially reciprocable screw rotatable in the barrel to advance plastic resin therein forward while working such resin to convert it from solid to melted state by the time it reaches the barrel's front end, a nozzle at such end for injecting the melted resin into a mold or other receiving means, and a plurality of heater bands ringing and axially spaced over the length of the barrel to provide supplemental heat for heating such resin. The improvement to the apparatus is in the nature of a heat control arrangement therefor comprising annular thermal insulating means disposed and around outside first heater bands ringing a rear section of the length of the barrel and annular uninsulating enclosure means disposed around and outside second heater bands ringing a forward section of the length of said barrel, said insulating means and uninsulating means being separately adapted in relation to the heating effect of the other to, respectively, impede radially outward flow of heat from the first heater bands therein and promote radially outward heat from the second heater bands therein. The mentioned heat control arrangement is thereby structurally differentiated to retain more heat over the barrel's rear part than is retained over its front part and to lose more heat over the barrel's front part than is lost over its rear part. Moreover, such arrangement does not require either the costly grooves characterizing the Van Riper apparatus or any liquid cooling means for cooling the rear part of the barrel.

BRIEF DESCRIPTION OF THE DRAWINGS

For a better understanding of the invention, reference is made to the following description of exemplary embodiments thereof, and to the accompanying drawings wherein:

FIG. 2 is a front elevation of plastic injection apparatus having heat control means according to the invention, the exterior of such apparatus being broken away except in the lower left-hand corner of the drawing, and the part of the apparatus shown by the breaking away being cross sectioned in part; and FIG. 3 is a front elevation in cross section of a modification of FIG. 2, the exterior of the apparatus being broken-away on the right-hand side of the drawing.

DESCRIPTION OF THE EMBODIMENT

Figure 1:
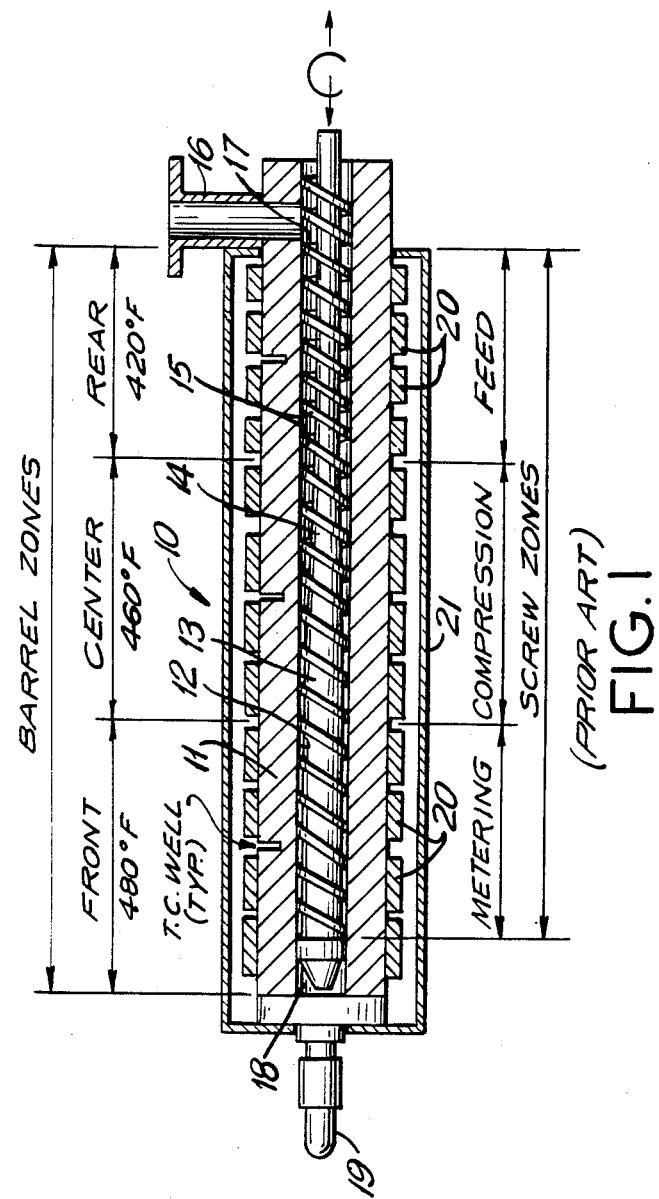
FIG. 1 is a front elevation in cross section of plastic injection apparatus according to the prior art.

To describe first what is old, referring to FIG. 1 a plastic molding injector 10 comprises a barrel 11 with a cylindrical bore 12 having therein an axially reciprocable and rotatable screw 13 of which the stem 14 is convergently tapered rearward, but of which the threads 15 have a constant O.D. fitting with a small clearance the I.D. of bore 12. Solid pellets of plastic resin are fed from feed throat 16 into the screw interthread space 17. Because of friction from the wall of the bore, the resin does not within space 17 rotate in fixed relation with the threads 15. Instead, the resin has a rearward slippage with respect to the thread surfaces which contact it. As a result, there is shear between such thread surfaces and the resin material, and such thread surfaces wedge the resin axially forward in the bore 12. Due to such shearing action and, also, the taper of stem 14 which cause the size of the interthread space 17 to progressively decrease forwardly, the resin is worked by screw 13 to become heated, plasticized and melted as it moves forward. Eventually, the melted resin advances to the front 18 of the bore where the progressively increasing accumulation of resin causes axial rearward displacement of screw 13 relative to barrel 11. Such rearward displacement of the screw continues until an injection of plastic is desired. At that time, a hydraulic ram (not shown) at the rear of screw 13 drives the screw forward to force outward through nozzle 19 and into a mold or other receiving means a portion of the melted resin accumulated in the front 18 of bore 12.

The barrel 11 is surrounded by a plurality of annular axially spaced fast-response heater bands 20 in contact with the outside of the barrel and not sheathed on their outsides by any jackets of insulating material. The heater bands in turn are surrounded by a cover means 21 which extends over substantially the full length of the barrel.

Turning now to some considerations involved in providing appropriate heat control for plastic injection equipments of which a typical prior art equipment is shown by FIG. 1, there has been considerable controversy in the molding industry over the effectiveness of insulating injection barrels and/or heater bands in order to conserve energy, improve melt quality and reduce effects of radiated heat on air conditioned facilities. This can now be accomplished according to the invention. However, to appreciate the invention, it is necessary to have a basic understanding of the reciprocating screw concept and the use of black body absorption, reflective surfaces, and controlled cooling using radiation and conductive heat flow to accomplish this goal.

Injection units used in injection molding employ heated barrels divided, in most cases, into three zones; front, center and rear. Heater bands are mounted along the length of the barrel and zone temperatures are individually controlled by separate thermocouple and temperature controllers. The reciprocating screw operates within the center-bored area of the barrel. Barrel zone lengths are generally related to the three (or more) zones of the reciprocating screw, namely; metering (front), compression or transition (center) and the feed (rear) zone. Heat is applied through the barrel zones as required to aid in plasticizing the plastic resin. FIG. 1 shows a typical barrel temperature profile, set up by zone, for melt temperatures and thermal energy input which may be used for molding ABS. Other materials present a similar profile, depending on their specific melt temperature requirements.

The level of thermal energy input needed at the feed zone is pronounced, with heaters being on for approximately 80% of operating time to provide rapid heating of the resin pellets prior to feeding into the compression zone. The function of the compression zone is to plasticize and mix the resin. This is accomplished through screw rotation which results in considerable shear heat energy being input into the melt. As a result of shear heating, center zone heaters are required to be actuated for approximately 20% of operating time. Any excess heat generated in the compression zone is undesirable due to its effect on melt consistency and resulting variations in molded part integrity, weight, configuration and appearance. It is important to realize that the heat energy contained in the plasticized resins is, as the screw rotates and retracts, pumped through the metering zone and ahead of the screw tip into the front zone of the barrel. Again, due to the high amount of shear heat energy, front zone heaters are only actuated for approximately 10% of operating time. Note that the function of the front zone of the screw (metering zone) is to convey material at a given rate and, since it does no plasticizing, generates little or no heat. Energy gained by the melt through shearing action is released radially outward throughout the front and adjacent one third (approximate) of the center zones of the barrels. Due to the normal heater band response time and the inability to effectively remove large quantities of heat within a relatively short time interval, with the FIG. 1 heat control arrangement, this area of the barrel constantly fluctuates between overheating to underheating conditions.

A review of recent publications pertaining to the design of barrel covers and the use of various types of heater bands to conserve energy, improve melt consistency and reduce the adverse effects of radiated heater band energy on shop air conditioning systems, indicates that efforts centered mostly on the barrel zones with little or no consideration given to the effects of the reciprocating screw. This is undoubtedly a carry-over of extruder technology where the barrel and screw remain in the same relative axial position.

In instances where barrels were shrouded with insulated covers, too much heat was trapped. The removal of covers or the use of cooling fans resulted in erratic heating throughout the length of the barrel. The use of insulated ceramic heater bands significantly reduced radiant thermal losses. However, due to the slow response time inherent with this type band, low heats resulted in a more viscous melt with a related increase in screw torque and subsequent increased energy usage. This energy use is significant enough to offset associated energy savings. Overheating conditions, also significant with insulated bands, cause detrimental effects on the molded product as noted above. However, I have observed that, when properly utilized in conjunction with fast-response heater bands, insulated ceramic heater bands perform well within their design intent and can indeed provide a net reduction in energy loss.

The goal then, is to prevent excessive heat losses in those areas requiring substantial application of external heat energy (rear and adjacent area of center zone) and to provide a means of controlled removal of excess thermal energy in areas where heat is accumulated as a result of internal shear heating. FIG. 2 depicts a design concept utilizing conventional fast-response heater bands to accomplish the above goal. FIG. 3 is an alternate design permitting the combined use of fast-response heater bands and insulated ceramic heater bands. Both designs incorporate the use of reflective surfaces to contain heat where desired and black body absorption with controlled cooling to provide heat removal and retrieval for reuse in die heating, shop environmental heating or other applications.

The features of the FIG. 2 and FIG. 3 embodiments will now be discussed in further detail.

Referring first to FIG. 2, the cover means 21 which extends without structural differentiation over the full length of barrel 11 (FIG. 1) is replaced in part in FIG. 2 by annular insulating means 25 which is disposed around and outside first heater bands 40 ringing a rear section or rear part 41 of the barrel. Part 41 includes, as shown, all of the discussed rear zone of the barrel and a rear portion of its central zone. Annular insulating means 25 takes the form (FIG. 2) of a tubular insulating shroud comprising (a) a circular cylindrical shell 42 coaxial with barrel 11 and of greater I.D. than the O.D. of heater bands 40 to be spaced from such bands by a radial gap, and (b) two planar annular end closures 43 disposed at opposite ends of shell 42 and having similar circular respective apertures therein through which barrel 11 passes in close fitting relation. Shroud 25 is constituted of high temperature insulating material which impedes outward flow by convection or conduction of heat from the heater bands 41. On its inside, shroud 25 is lined with metal providing a shiny surface 26 which reflects back towards barrel 11 a substantial fraction of the heat radiated outward from heater bands 40. Such first heater bands are conventional fast-response heater bands which lack any heat insulating jacketing on the outsides thereof.

Forward of insulating shroud 25 is an annular uninsulating enclosure means 27 disposed around and outside second heater bands 50 ringing a forward section or forward part 51 of barrel 11, such forward section or part 51 including, as shown, the discussed front zone of the barrel and that portion of the barrel's central zone not enclosed by shroud 25. Thus, the rear end of enclosure means 27 abuts, as shown, the front end of such shroud. In FIG. 2, the uninsulating enclosure means 27 takes the form of a tubular metal cover coaxial with barrel 11 and having an I.D. greater than the O.D. of the second heater bands 50 enclosed by cover 27 so as to be spaced from those bands by a radial gap. Bands 50 are, like bands 40, conventional fast-response heater bands lacking any heat insulating jacketing on the outsides thereof.

The metal cover 27 has a black inner surface 28 and a reflective outer surface 29 so as to be well adapted to radiate heat. Cover 27 is a two-part hinged cover of which the two parts may be latched together by a hasp 30. Mounted on the outside of cover 27 are coolant coils 31 through which is circulated cooling fluid which preferably is a liquid. Within cover 27, heat may controllably be either pumped into or out of the barrel by selectively adjusting the heating effect of the heating bands 50 within cover 27 and the cooling effect of the coils 31. 1 The FIG. 3 embodiment differs from that of FIG. 2 in that the heat insulating shroud 25 (FIG. 2) has been replaced (in FIG. 3) by a tubular axial extension 35 of the metal cover 27, and the conventional fast response first heater bands 40 (FIG. 2) have been replaced (in FIG. 3) by ceramic first heater bands 36. As shown, extension 35 is coaxial with barrel 11, and the inside of extension 35 is radially spaced by a gap from the first heater bands 36. The inside surface of extension 35 is a shiny surface 55 adapted to reflect back towards barrel 11 a substantial fraction of the heat radiated outwardly and impinging on that surface. Hence, considering the inside of the entire enclosure formed by metal cover 27 and its extension 35, the portion of that inside which encloses barrel rear part 41 has a black heat-absorbent surface 55, while the portion of that inside enclosing barrel front part 51 has a heat-reflective surface 29.

Disposed around and outside ceramic first heater bands 36 is annular thermal insulating means in the form of a plurality of heat insulating jackets 37 each ensheathing and making contact with the outside of a respective one of such heater bands. Jackets 37 are constituted of high temperature thermal insulation material which impedes radially outward flow by convection and conduction of heat emanated from the outer sides of the bands 36. By virtue of bands 36 having such jackets 37, these heater bands are slow-response bands in the sense that they have a relatively high thermal inertia as compared to the fast-response heater bands 50.

Over the front part 51 of the apparatus, the FIG. 3 embodiment is substantially the same as the FIG. 2 embodiment. That is, the FIG. 3 embodiment can be arrived at by modifying only the rear part of the FIG. 2 embodiment.

Associated with each of the FIG. 2 and FIG. 3 embodiments is the usual assortment (not shown) of thermocouples for measuring the temperature of the barrel at various points along its length, current control devices for selectively varying the values of the electric currents passing individually through the first and the second heater bands, and liquid coolant regulating devices for selectively varying the rate of flow and temperature of the liquid coolant passing through the cooling piping 31 mounted on the outside of metal 37 to be in thermal and mechanical contact therewith. Such aggregate of instrumentalities permits selective controlling of the heat and temperature conditions obtained in the course of the operation of the apparatus of FIG. 2 or FIG. 3.

In the case of each of such embodiments the heating arrangement thereof is structurally differentiated over the full length of barrel 11 so that, considering the front and rear parts of such length in relation to each other, the rear part inhibits loss of heat from the apparatus to the environment more than does the front part, and the front part promotes flow of heat from the apparatus to the environment more than does the rear part. Since the function of the heating arrangement in the rear part of the apparatus is to develop and retain as much heat as possible for use in the initial heating of the solid plastic resin introduced into the bore of the barrel, to have cooling means for such rear part would be superfluous, wherefore to provide such cooling means would not be the preferred practice of the invention. As will be evident, the improved barrel heat control arrangements depicted in FIGS. 2 and 3 have the advantages that they can be provided at low cost and are simple to implement in practice.

The above-described embodiments being exemplary only, it will be appreciated that additions thereto, modifications thereof and omissions therefrom can be made without departing from the spirit of the invention, and that, accordingly, the invention is not to be considered as limited save as is consonant with the recitals of the following claims.

What is claimed is:

1. The improvement in a plastic injector apparatus comprising, an axially extending barrel having a bore extending axially therethrough, and having a radial passage formed therein at the back end thereof for introducing solid plastic resin into said bore, an injection nozzle for injecting into receiving means amounts of melted resin accumulated in the front end of said bore, an axially reciprocable screw received in the rear opening of said bore and rotatable therein to work said introduced resin so as to heat it while advancing it forwards to said front end of said bore, and a plurality of heater bands ringing and axially spaced over the length of said barrel to provide supplemental heat for heating said resin, in which said improvement comprises: annular thermal insulating means comprising insulative material insulating against conductive and convective heat flow and disposed around and outside first heater bands ringing a rear section of the length of said barrel to impede radially outward flow of heat from said first bands, said insulating means being absent forward of said rear section, and annular uninsulating enclosure means disposed around and outside second heater bands ringing a forward section of the length of said barrel, said uninsulated enclosure means comprising at least part of an uninsulating cover containing and surrounding at least said forward section and having heat-absorptive and heat reflective surfaces registering with said forward section and disposed on, respectively, the inside and outside of said cover to promote radially outward flow of heat from said second heater bands through said cover.

2. The improvement according to claim 1 in which said annular thermal insulating means comprises a tubular insulating shroud containing and surrounding said rear section of said barrel such that the inside of said shroud is spaced by a radial gap from the outside of said first heating bands.

3. The improvement according to claim 2 in which the inside surface of said shroud is a heat-reflective surface.

4. The improvement according to claim 2 in which all said uninsulating cover disposed axially forward of said shroud and contains and surrounds said forward section of said barrel such that the inside of said cover is spaced from the outside of said second heater bands by a radial gap.

5. The improvement according to claim 1 in which said annular thermal insulating means comprises a plurality of insulating jackets each disposed on the outside of a respective one of said first heater bands.

6. The improvement according to claim 5 in which said annular thermal insulating means further comprises a tubular enclosure containing and surrounding said rear section of said barrel and having its inside spaced by a radial gap from said jackets, said enclosure having an inside surface which is heat reflective.

7. The improvement according to claim 6 in which such tubular enclosure is the rear part of said uninsulating cover of which the front part provides said uninsulated enclosure means disposed around and outside said second heater bands ringing said forward section of said barrel, such front part of said cover containing and surrounding said second bands so that its inside is spaced from such bands by a radial gap, and said cover having on the inside, of said cover a heat reflective surface.

* * * * *